UNITED STATES PATENT OFFICE.

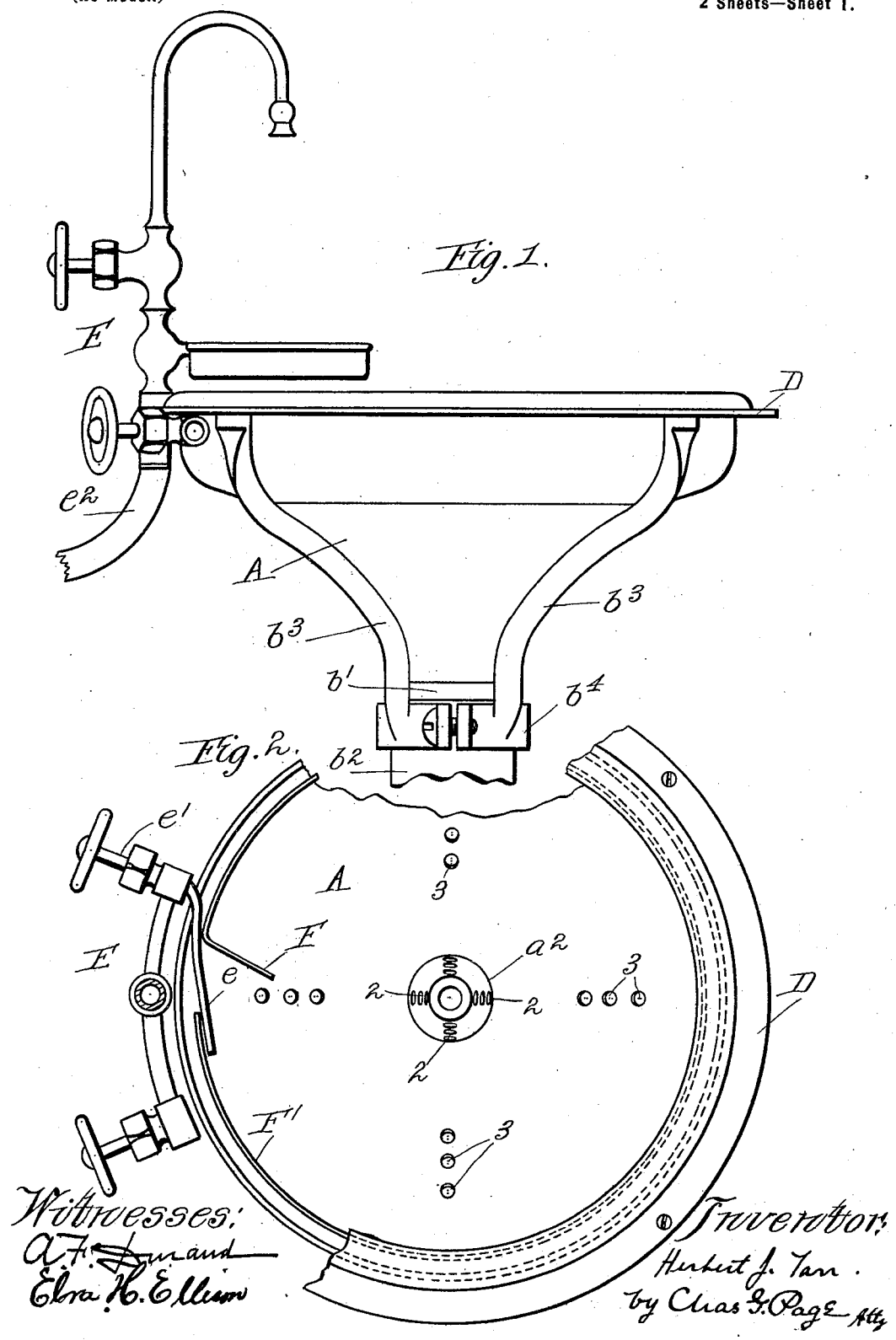

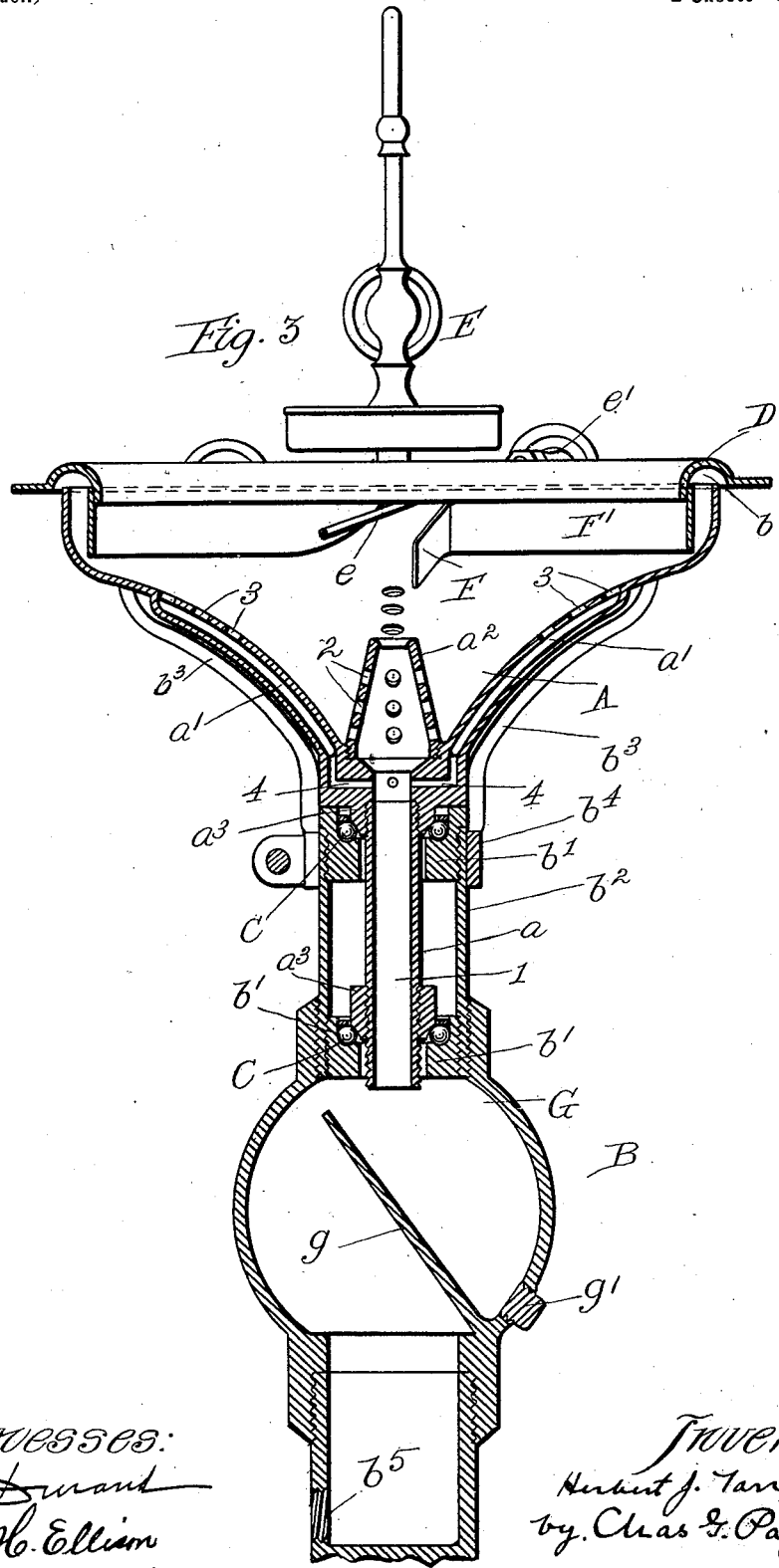

HERBERT J. TARR, OF CHICAGO, ILLINOIS.

DENTAL CUSPIDOR.

SPECIFICATION forming part of Letters Patent No. 660,172, dated October 23, 1900.

Application filed December 3, 1898. Serial No. 698,209. (No model.)

*To all whom it may concern:*

Be it known that I, HERBERT J. TARR, a citizen of the United States, residing at Chicago, in the county of Cook, State of Illinois, have invented a certain new and useful Improvement in Dental Cuspidors, of which the following is a specification.

My invention relates to that class of cuspidors involving a rotary bowl and a jet of water for rotating the same, the rotation of the bowl by such means operating to keep the latter clean and free from objectionable matter.

The objects of my invention are to generally simplify and improve the construction of cuspidors of this class, to provide an improved arrangement which will tend to facilitate the discharge from the bowl, to provide an improved arrangement which will tend to prevent overflows from the bowl, to reduce the cost of manufacture, and to provide certain details and features of improvement tending to render a device of this character serviceable and thoroughly reliable.
To the attainment of the foregoing and other useful ends, my invention contemplates a cuspidor comprising a rotary bowl which is constructed with a principal or main discharge-passage and which is also provided with one or more supplemental or by-pass openings. Preferably the principal discharge opening or passage is provided or formed by a tubular discharge-stem depending from the lower portion of the bowl and the supplemental or by-pass opening or openings are arranged to open through the sides of the bowl and communicate with the said discharge-stem. The bowl can be mounted for rotation upon suitable bearings, and the rotation of the bowl is preferably obtained by forcing a small stream or jet of water tangentially against the inner surface of the bowl. In this way the bowl is kept clean and free from all objectionable matter. The water which rotates and cleanses the bowl is discharged through the latter's tubular stem. Should this tubular stem at any time become clogged, the water will then be discharged from the bowl by way of the supplemental or by-pass opening. Any suitable arrangement may be employed for governing the rotation of the bowl, as will hereinafter more fully appear.

In the accompanying drawings, Figure 1 represents in side elevation the upper portion of a cuspidor constructed in accordance with my invention. Fig. 2 is a plan of the same, a portion of the annular guard being broken away so as to show the governor and nozzle. Fig. 3 is a vertical section taken on line $x$ $x$ in Fig. 1.

The cuspidor, as illustrated, comprises the rotary bowl A, having the downwardly-extending discharge stem or spindle $a$ and the overflow-chamber $a'$. The upper end of the bore 1 of the said stem or spindle is preferably covered by a removable cap $a^2$, having perforations or relatively-small outlet-openings 2, and the overflow-chamber, which, it will be observed, is formed by the space between the outer and inner walls of the bowl, is provided with inlet and outlet openings 3 and 4. Ordinarily the perforations or openings in the cap are sufficient to insure a free and unrestricted escape of the water from the bowl; but should the perforations in the cap become clogged and the water in the bowl rise above the apex of the latter the water will then enter the chamber $a'$ by way of the openings 3 and escape therefrom into the bore 1 by way of the openings or passages 4. In such manner all danger or possibility of an overflow from the rim of the bowl is avoided and a free and unrestricted discharge insured at all times.

The standard or support B is preferably tubular or hollow and adapted at its upper portion to receive the stem or spindle $a$ of the bowl A.

If so desired and with a view to securing a smooth and easy running or rotation of the bowl, antifriction-balls C are interposed between the cones $a^3$ on the stem and cups $b'$ on the support or standard. The bowl thus supported and rotating upon ball-bearings may be rotated at the desired speed with a comparatively-weak water-pressure, and, furthermore, the bowl will rotate smoothly and without wabble or objectionable noise. If ball-bearings are employed, the cones and cups may be made removable in any known or approved manner; but I prefer to adopt a construction substantially as shown, wherein it will be observed that the upper cone is integral with the bowl, while the lower one is screwed onto the threaded end of the stem or spindle, and that both cups are screwed into the short section of pipe $b^2$, which forms the socket for the stem or spindle of the bowl. It will also be observed that the said stem or spindle is preferably screwed into the bowl and that the socket-piece $b^2$ is externally threaded at its lower end and screwed into the upper portion of the standard proper, B.

To protect the bowl against contact with objects which would tend to stop the rotation of the bowl, the latter is protected by an annular guard D, having an annular groove or channel $d$ formed upon its under side and conveniently supported upon arms $b^3$, radiating from the upper end of the standard B. The guard thus arranged above the perimeter of the bowl insures an uninterrupted rotation of the latter and also serves as a convenient support for the water fixtures or fittings E. The supporting-arms $b^3$ may be integral with the standard B, but are preferably formed integral with a split collar $b^4$, which clamps upon the upper end of the socket-piece $b^2$.

The bowl is preferably rotated by means of a jet of water forced tangentially against the inner surface of the bowl, such jet of water being projected from a nozzle $e$, having suitable connection with the fixtures or fittings E, and a valve $e'$ being provided for cutting off and turning on the water supplied through the pipe $e^2$. As a means for counteracting an increase of water-pressure and a consequent acceleration of speed on the part of the bowl and a swashing or slopping over of the water therein a governor may be employed, which will serve to retard or obstruct the swirling movement of the water within the bowl in the event of an increase of pressure and which will in this way prevent an undesirable slopping over of the water upon the floor or carpet. Any suitable form of governor may be employed for this purpose. The governor illustrated consists of a flat blade or projection F, which is in this case secured or fixed to the guard and which extends or projects a suitable distance into the interior or hollow of the bowl. (See Figs. 2 and 3.) Upon an increase of water-pressure the speed of the bowl and the swirling movement of the water therein would be accelerated, the water in such case being gradually carried up the sides of the bowl by centrifugal force, and, with nothing to retard or obstruct, the water would of course be then carried over the rim of the bowl and onto the floor; but by employing a governor such as shown and described or any other suitable form the swirling or rotary movement of the water within the bowl is retarded or obstructed, and such retardation of the water will obviously operate to retard the rotation of the bowl.

My improved cuspidor is designed principally for use in dental work and is therefore preferably provided with a trap for recovering and holding any gold that may find its way into the bowl. As a simple and effective arrangement for so doing the standard B is provided with a chamber G, divided into two compartments by an oblique partition or web $g$. The water, &c., discharged from the lower end of the stem or spindle $a$ will enter and fill one compartment and then overflowing to the other compartment escape by way of the outlet $b^5$. With such arrangement the gold will obviously settle and collect in the first compartment and may then be withdrawn by removing the plug $g'$.

From the foregoing it will now be seen that I provide an exceedingly efficient and serviceable cuspidor of the class known as "fountain-spittoons," that the construction and arrangement of the cuspidor are such as to insure a free and unrestricted discharge, that the by-pass arrangement tends to insure against an overflow from the bowl in case the principal discharge-passage becomes clogged, and also that the general construction is simple and of a character to render the device inexpensive and thoroughly reliable.

What I claim as my invention is—

1. In a cuspidor, a rotary bowl having its lower portion provided with a tubular discharge stem or spindle the bore of which extends downwardly and centrally from the lowest point in the bowl, the latter being also constructed with inner and outer walls having between them space affording an overflow-chamber which is arranged to receive the overflow from the interior of the bowl and discharge the same into the rotary and tubular stem depending from the bottom of the bowl; suitable bearings upon which the bowl is arranged to rotate; and means for forcing a jet of water tangentially against the interior of the bowl to both rotate and cleanse the same, the water being discharged from the bowl by way of the said rotary and tubular stem.

2. In a cuspidor, a rotary bowl having its lower portion provided with a tubular discharge stem or spindle the bore of which extends downwardly from the lowest point in the bowl; ball-bearings arranged lateral to the said tubular and rotary discharge-stem and upon which the bowl rotates; the said bowl being constructed with inner and outer walls providing an overflow-chamber arranged to receive the overflow from the bowl and discharge the same into the rotary and tubular stem depending from the bottom of the bowl; and means for forcing a jet of water tangentially against the inner surface of the bowl to both rotate and cleanse the same, the water being discharged from the bowl by way of the latter's rotary and depending stem.

3. In a cuspidor, a rotary bowl adapted and arranged for continuous rotation and constructed and provided with inner and outer walls, the space between said walls being adapted to provide an overflow-chamber; said chamber being provided with suitable inlet and outlet openings, the former leading from the interior of the rotary bowl to the upper part of the said overflow-chamber, and the latter leading from the lower portion of said chamber to the main discharge-passage; and means for maintaining a jet of water for rotating the said bowl.

4. In a cuspidor, a rotary bowl having a downwardly-extending tubular discharge stem or spindle, and also provided with an overflow-chamber having suitable inlet and outlet passages, the latter leading to the bore of said stem or spindle; a removable perforated cap covering the upper end of the bore of the tubular stem or spindle, and means for maintaining a jet of water for rotating the bowl.

5. A cuspidor comprising a rotary bowl adapted and arranged for continuous rotation, and provided with a downwardly-extending tubular or hollow discharge stem or spindle; a tubular support or standard adapted to receive the said tubular and rotary stem or spindle, a stationary guard arranged above the perimeter of said bowl and means for maintaining a jet of water for rotating the bowl.

6. A cuspidor comprising a rotary bowl adapted and arranged for continuous rotation and provided with a downwardly-extending tubular or hollow discharge stem or spindle, a tubular support or standard adapted at its upper end to receive and form a bearing for the said rotary stem or spindle, a guard arranged above the perimeter of the bowl and supported upon arms which radiate or extend upwardly from the upper end of said tubular support or standard, and means for maintaining a jet of water for rotating and cleansing the bowl in the manner described.

7. A cuspidor comprising a rotary bowl adapted and arranged for continuous rotation and provided with a downwardly-extending tubular discharge stem or spindle; a tubular support or standard adapted at its upper end portion to receive and form a bearing for the said tubular and rotary stem or spindle, an annular guard arranged above the bowl and provided on its under side with an annular groove adapted to receive the perimeter or edge of the bowl, the said guard being supported upon arms which radiate or extend upwardly from the upper end of said support or standard; and means for maintaining a jet or stream of water for rotating the bowl.

8. A cuspidor comprising a rotary bowl adapted and arranged for continuous rotation, and provided with a downwardly-extending and hollow discharge stem or spindle; a support or standard adapted at its upper end to receive the said rotary discharge stem or spindle, a split collar clamped on the upper end of said support or standard and provided with upwardly-divergent supporting-arms, a guard arranged above the perimeter of the bowl and supported upon said arms, and means for maintaining a jet of water for rotating said bowl.

9. A cuspidor comprising a single rotary bowl constructed with double walls, the space between said walls being adapted to provide an overflow-chamber, the bowl being provided with a principal discharge-opening and also with one or more supplemental discharge-openings, the latter leading from the interior of the bowl to the said space between the said walls of the bowl, and the said overflow-chamber being provided with one or more ducts or channels whereby the overflow will be discharged into the said principal discharge-channel leading from the interior of the bowl; and means for maintaining a jet of water for rotating the said bowl.

HERBERT J. TARR.

Witnesses:
ARTHUR F. DURAND,
ELVA H. ELLISON.